United States Patent Office 2,856,940
Patented Oct. 21, 1958

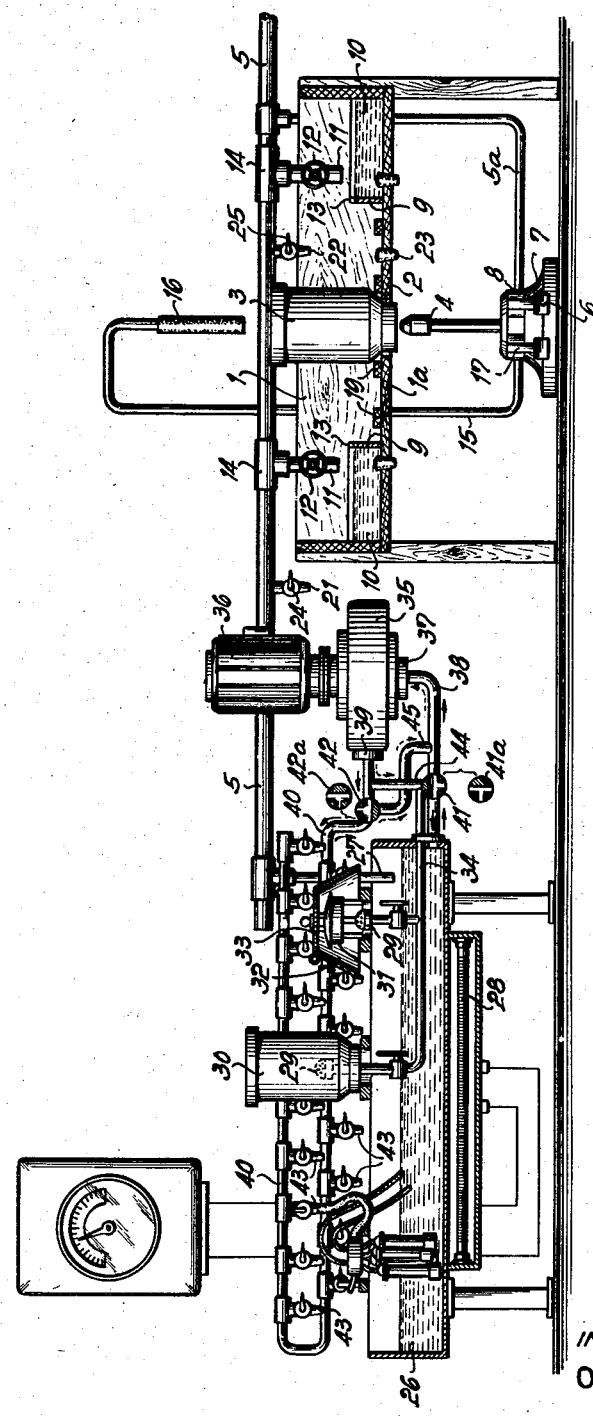

2,856,940

CLEANSING PLANT FOR THE CLEANSING OF MILKING-MACHINE PARTS AND MILKING UTENSILS

Otto Paul, Lubeck, Germany

Application March 29, 1955, Serial No. 497,620

Claims priority, application Germany April 6, 1954

2 Claims. (Cl. 134—108)

This invention relates to a plant or arrangement for the rinsing and cleansing of milking machines, milking machine parts, cans, buckets and the like, in which a cleansing and disinfecting solution is caused by a pump to pass from a storage basin to a pressure pipe and back to the basin.

In known cleansing arrangements of this kind the cleansing solution is caused to alternately circulate in one direction and the other. Employed for this purpose is the vacuum pump of the milking plant, and the reversal of the direction of flow is effected by the pulsator of the milking plant. An important drawback of these known arrangements resides in the feature that by means of the vacuum of the milking plant only a very small speed of flow of the cleansing solution through the milking means can be achieved, so that a thorough cleansing can not be relied upon even in long working hours. Furthermore, constructions of this known kind can be employed only for the cleansing of machine parts which are coupled together in such manner that a closed circulation of the cleansing solution is thereby enabled, while a cleansing of all of the other milking utensils, such as milk cans, milking buckets etc. is not possible.

Hence, the object of the invention is to overcome these deficiencies of known cleansing arrangements and to achieve, without loss of expensive cleansing and disinfecting solutions, a thorough cleansing of all air and milk carrying parts of the milking machines, as well as of all milking utensils, such as strip cups, milking buckets, strainers, milk cans, milk tanks etc. with which the milk comes in contact.

Accordingly, the invention resides chiefly in the feature that there are provided in the suction pipe and pressure pipe of a rotary pump a plurality of switch cocks by means of which it is possible to change, with the pump rotating constantly in the same direction, the suction pipe to pressure pipe and the pressure pipe to suction pipe, and that the pressure pipe is provided with connecting branches, fitted with shut-off means, for connection to the air-carrying and milk-carrying parts of milking machines.

As in an arrangement of this kind the circulation of the cleansing and disinfecting solution is effected by a rotary pump rotating constantly in the same direction, it is obvious that, compared with plants of known construction, a considerably increased circulation speed is achieved in the parts of the milking machine to be cleaned. Furthermore, it is then possible to obtain a cleansing and disinfection of all parts which come in contact with the milk, whereby only a very small quantity of cleansing and disinfecting solution is needed.

According to the invention a cleansing and disinfecting plant of this type is preferably further provided with a pre-cleansing arrangement by means of which all of the parts to be cleaned are first pre-cleaned with cold water, so that the coarse particles of dirt are already loosened and removed before the final cleansing and disinfection by means of the expensive solution or lye is carried out. In a preferred embodiment of this pre-cleansing arrangement, the bottom of the cleansing basin is provided with an opening for the arrangement therein of the neck-portion of milk cans, or for the arrangement thereon, upside down, of milking vessels or the like, whereby underneath the opening a nozzle is arranged which, upon actuation by the hand or foot of the worker, spouts water through the opening, and whereby the nozzle water is supplied from a water pipe under pressure provided with connecting branches fitted with shut-off means and with hoses extending into the cleansing basin, and whereby further some of the connecting branches supply water into smaller separate basins provided with comparatively low overflow walls.

With the aid of a pre-cleansing arrangement of this type, the parts to be cleaned are first pre-cleansed with cold running water, so that for the subsequent final cleaning and disinfection only comparatively small quantities of dissolving agents are needed. Furthermore, the intensity of the cleansing will be considerably augmented in this way.

Additional features and advantages of the invention will be understood from a consideration of the following detailed description taken in connection with the accompanying drawing, forming a part of this specification and in which an embodiment of the invention has been shown by way of example. However, I wish to say that the invention is not confined to any strict conformity with the showing of the drawing, but may be changed or modified, so long as such changes or modifications mark no material departure from the salient features of the invention as expressed in the appended claims.

In the drawing a preferred embodiment of the invention has been shown partly in side elevation and partly in section.

In the embodiment illustrated in the drawing, the reference numeral 1 designates a rinsing basin, of wood or the like, having its bottom 1a provided with an opening 2 for the arrangement thereon of milking utensils, or for the insertion thereinto of the neck portions of cans 3 for the transport of milk with their openings down. Arranged beneath the opening 2 of the rinsing basin 1 is a nozzle 4 actuatable by the hand or foot of the worker and adapted to spout the rinsing water through the opening 2 in upward direction, whereby the rinsing water is supplied to the nozzle 4 under pressure via the water pipe 5a. In the embodiment the spouting action of the nozzle 4 is controlled by a pedal 6 which within the casing 7 is connected with the control valve 8 of the nozzle.

Provided within the rinsing basin 1, at both ends of the latter, are comparatively low partition walls 9, forming within the larger rinsing basin 1 smaller basins 10 for brushes or other articles which have to be cleaned to be placed in. Preferably the inflow of water into these basins 10 is constantly renewed in order to have the brushes and other articles in these basins constantly rest or float in clean water. For this purpose pipes or pieces of hose 11 may be so arranged that, upon opening of the valves 12, cold water constantly runs from the upper pressure conduit 5 into the basins 10, and from there over the edges 13 of the low partition walls 9 and through the opening 2 to the floor of the room. Connected to the valve casing 7 is another pipe 15 provided with the valve 17. Onto the upper end of this pipe 15 a rubber hose 16 is slipped for the speedy inflow of cold water into the can or the like with the latter in normal position, that is to say, with its open end extending in upward direction. Then follows the first washing or pre-cleansing of the interior of the can 3 or the like by hand or by means of a brush placed for this purpose in one of the small basins 10. After this, the can 3 is inserted, with its neck-portion down, into the opening 2, whereupon all of the constituents of milk or the like, loosened from the inner walls through brushing, are removed through actuation of the valve 8, that is to say, through spouting of water under pressure via the nozzle 4 into the interior of the can 3, which water then runs down to the floor of the washing room and through an opening in the floor to some other place of use.

For the pre-washing and rinsing of the outer surfaces of cans or other utensils, the latter are placed flat into the basin 1 and then cleaned by hand with the aid of a brush moistened with the clean water in the smaller basins 10. After this, all of the constituents of milk or the like still found on the outer surfaces of the utensils are washed off completely, after opening of the valve 17 or 17a, with the aid of the hose 16.

In order to protect the bottom 1a of the basin 1 against wear, it is provided with parallel protective ribs 19, of wood or the like.

The arrangement of the invention can, as already mentioned, also be used for the cleansing and pre-cleansing of parts of milking machines. For this purpose the cold water conduit 5 is provided with a suitable number of connecting branches 21, 22 fitted with shut-off means and onto which can be slipped the milk and air containing hoses of milking machines serving as connections with the teat-cups, distributors and lids of the milking buckets. All of these parts rest in the basin 1, so that upon opening of the water taps cold water under pressure runs into the connecting branches and from there through the hoses and parts of the milking machines, whereby the residues of milk are washed out. It is also possible to close up the opening 2 of the basin 1 with a cover and to attend to the outer pre-washing and rinsing of the hoses and milking-machine-parts by hand with a brush, as already described for the pre-washing of the cans or the like. The water running into the rinsing basin 1 is passed on to the floor of the room through opening of the plug 23 in the bottom 1a of the basin. In order to speed up the washing action as much as possible, all of the water taps or valves 8, 12, 17, 24 and 25 should preferably be devised as quick action stop valves.

After the pre-washing or rinsing of the inner and outer surfaces of the milk-cans, vessels, filters and milking-machine-parts by means of cold water has been carried out, the final cleansing is effected in a special working action by means of the arrangement illustrated on the left side of the drawing with the aid of hot water to which cleansing means and disinfecting means are added in known manner.

In the embodiment shown in the drawing, a basin 26 has been provided for the final cleansing and disinfection, which basin 26 is either filled up with hot disinfecting lye, or into which, preferably via a connecting branch 27 of the cold water conduit 5, cold water is conveyed, which then is heated by means of electric heating coils 28, gas or the like, whereupon to the heated water a suitable quantity of cleansing and disinfecting means are added. Provided within the basin 26 may be one or a plurality of nozzles 29 projecting from the lye in upward direction. The nozzles 29 may be so devised and positioned that on one of them a milk-can 30 or a bucket etc. can be arranged, while another nozzle 29 serves as cleansing means for smaller objects, such as lids 31 of cans or the like. The latter nozzle 29 is preferably devised as spray-nozzle and surrounded by an upwardly conically tapered sheet-metal casing 32 provided at its upper end with a hinged cover 33. In this way the water sprayed by the nozzle is partly sprayed directly against the article to be cleaned, and partly against the conical sheet-metal casing, so that in this way a cleansing of the article on its inside and outside is achieved. To the nozzles 29, the lye of the basin 26 is conveyed under pressure in known manner by a rotary pump 35. The pipe 34 leading to the nozzle 29 is connected to the pressure pipe between the pressure branch of the pump 35 and the three-way-cock of the pressure pipe, so that the pipe 34 always remains pressure pipe, also after reversal of the three-way-cock, as hereinafter described.

The rotary pump 35, which may be a centrifugal pump, is driven from an electromotor 36 and sucks in the lye from the basin 26 via the suction branch 37 and the suction conduit 38, and then forces this lye via the pressure branch 39 into a pressure pipe 40.

According to the invention, the suction pipe 38 as well as the pressure pipe 40 are each provided with a three-way-cock 41 and 42. Both of these two three-way-cocks can be adjusted in two position. In the embodiment shown in the drawing the position of these three-way-cocks is so adjusted that the suction pipe 38 is connected via the three-way-cock 41 with the suction branch 37 of the pump, while the pressure branch 39 is connected via the three-way-cock 42 with the pressure pipe 40. The pressure pipe 40 may be provided with several connecting branches 43, and to these may be secured the milk-hose of a milking machine. The milk-hose may, for example, be pulled off the cock of the milking-bucket-lid and be secured to the connecting branches 43, while the milking cups are held or suspended, with their open end down, above the basin 26. As soon as the rotary pump 35 is caused to rotate, it sucks the lye out of the basin 26 and forces it via the pressure pipe 40 into the milk-hose of the milking machine and from there via the milking cross through the hose of the milking cups and through the teat-rubbers, whereupon it returns to the basin 26. After the lye has been sucked for a sufficient length of time in this direction of flow through the milking machine, the direction of flow through the milking machine or the aforesaid parts of the latter is reversed. For this purpose the two-way-cocks 41 and 42 are rotated through an angle of 90 degrees, so that they are now in the positions 41a and 42a shown beside the aforesaid positions 41 and 42. In these positions 41a and 42a the suction conduit 38 is shut off in the direction toward the suction branch 37 of the pump 35 and connected with a branch pipe 44 extending from the pressure pipe 40 between the pressure branch 39 and the three-way-cock 42. In addition to this, the pressure pipe 40 is in the position 42a of the three-way-cock 42 shut off in the direction toward the pressure branch 39, and instead of that connected via a branch pipe 45, extending from the suction conduit 38 between the suction branch 37 and the three-way-cock 41, with the suction conduit 38.

When the two three-way-cocks 41 and 42 are rotated to the positions 41a and 42a, the centrifugal pump 35 continues to rotate in the same direction, so that the pressure pipe 40 is now the suction pipe, while the suction pipe 38 is now the pressure pipe. In order to make it possible for the lye to flow through the milking-machine-parts, the teat-cups or free ends of the teat-rubbers are suspended in the lye of the basin 26, so that the lye now passes through the teat-rubbers, their connecting hoses, the milking-cross and through the milk-hose which is secured to one of the connecting branches 43 and then returns via the pipe 38 into the basin 26. One of the two directions of flow is indicated by full-line arrows, and the other one by broken-line arrows. It will be seen, therefore, that in the direction of flow marked by broken-line arrows, the lye passes via the milking means, the pressure pipe 40, the branch pipe 45, the centrifugal pump 35 and the branch pipe 44 to the suction pipe 38 and from there into the basin 26. The direction of flow may be reversed any desired number of times, so that all of the places and corners of the milking machine can thus be cleansed in perfectly satisfactory manner. Corners occur at all places where milk-carrying parts are connected with each other by hoses or the like, and it may be mentioned that by one direction of flow generally only those corners are cleaned from adhering impurities which face that direction of flow. When now, according to the invention, the direction of flow is reversed one or a plurality of times, the result is that all corners produced by hose-connections or the like are reliably cleaned by the lye flowing through the parts under pressure.

It is understood that the cleansing method with reversible direction of flow hereinbefore described for milk-carrying parts, can naturally also be applied to all air-carrying or vacuum-carrying stationary or movable parts and pipelines of stationary or transportable milking-machine plants.

What I claim as new and desire to secure by Letters Patent of the United States is:

1. In a plant for cleansing milking machine parts and utensils, a basin for cleansing and disinfecting solution, heating means for heating said solution, pressure piping including a plurality of valved branches extending therefrom, suction piping in communication with said pressure piping for withdrawing solution from said basin for transfer to said pressure piping, pump means having suction and pressure connections respectively connected to said suction piping and said pressure piping, a pair of three-way valves respectively located in said suction and pressure pipings, a first branch pipe connecting the valve associated with said suction piping with said pressure piping at a point between the pressure connection of said pump and the valve associated with said pressure piping, a second branch pipe connecting the valve associated with said pressure piping with said suction piping at a point between the suction connection of said pump and the valve associated with said suction piping, whereby said three-way valves may be operated to connect said suction piping with the pressure connection of said pump and the pressure piping with the suction connection of said pump to reverse the direction of flow of solution in said pipings while the direction of flow of the pump means remains unchanged, and a third branch pipe having one end connected with said first named branch pipe which is constantly under pump pressure and having a cleansing nozzle connected to the other end thereof, said nozzle being located above the level of the solution in said basin for cleansing milking machine parts and utensils.

2. In a plant as in claim 1 and further including a conical casing about said cleansing nozzle, the sides of said casing tapering upwardly, and a hinged cover on said casing at the upper end thereof.

References Cited in the file of this patent

UNITED STATES PATENTS

| | | |
|---|---|---|
| 713,842 | Blakeslee | Nov. 18, 1902 |
| 2,111,038 | Adams | Mar. 15, 1938 |
| 2,222,516 | Powell | Nov. 19, 1940 |
| 2,708,448 | Reeve | May 17, 1955 |
| 2,714,893 | Zimmer | Aug. 9, 1955 |